United States Patent [19]

Frick

[11] Patent Number: 5,041,869

[45] Date of Patent: Aug. 20, 1991

[54] PHOTOELECTRIC SCANNER

[75] Inventor: Beat Frick, Buchs, Switzerland

[73] Assignee: Gretag Systems, Seattle, Wash.

[21] Appl. No.: 574,773

[22] Filed: Aug. 30, 1990

[30] Foreign Application Priority Data

Sep. 1, 1989 [CH] Switzerland .................. 3171/89

[51] Int. Cl.[5] ............................................. G03B 27/52
[52] U.S. Cl. ........................................ 355/68; 355/71
[58] Field of Search ..................... 355/35, 36, 41, 42,
355/68, 71, 38; 350/273-275; 250/229, 232,
233, 237 R

[56] References Cited

U.S. PATENT DOCUMENTS

| 2,300,970 | 11/1942 | Reiss et al. | 355/35 |
| 3,677,641 | 7/1972 | King et al. | 355/68 X |
| 3,944,362 | 3/1976 | Dailey | 355/68 |
| 4,061,428 | 12/1977 | Amano et al. | 356/175 |
| 4,082,465 | 4/1978 | Bicki et al. | 356/203 |
| 4,188,125 | 2/1980 | Barbieri et al. | 355/38 X |
| 4,352,550 | 10/1982 | Uchida | 355/1 X |
| 4,472,046 | 9/1984 | Kohyama | 355/1 |
| 4,564,866 | 1/1986 | Comberg | 358/302 |
| 4,748,680 | 5/1988 | Margolin | 355/1 X |
| 4,760,421 | 7/1988 | Margolin | 355/1 |
| 4,873,546 | 10/1989 | Zahn et al. | 355/38 |
| 4,933,710 | 6/1990 | Beaulieu et al. | 355/38 |
| 4,951,084 | 8/1990 | von Stein et al. | 355/38 |
| 4,975,728 | 12/1990 | Gordon | 355/1 |
| 4,975,729 | 12/1990 | Gordon | 355/1 |

FOREIGN PATENT DOCUMENTS

| 312499 | 4/1989 | European Pat. Off. . |
| 2459456 | 6/1976 | Fed. Rep. of Germany . |
| 3737775 | 5/1989 | Fed. Rep. of Germany . |
| 2621710 | 4/1989 | France . |
| 637223 | 7/1983 | Switzerland . |

Primary Examiner—Brian W. Brown
Assistant Examiner—D. Rutledge
Attorney, Agent, or Firm—Burns, Doane, Swecker & Mathis

[57] ABSTRACT

The photoelectric scanner is equipped with two circular disks having aligned light passage orifices and mounted on a common drive shaft. Lenses are located in these orifices, the focal points of which are in the plane of the copy master to be scanned. The beam emitted by the source of copying light and parallelized by the condenser arrives through the curved slot of a stationary diaphragm on the lens instantaneously moving through the area of the slot and is focused in the plane of the copy master. From the lens synchronously running on the other side of the copy master, the parallelized beam of light arrives through the curved slot of a subsequent stationary diaphragm and a condenser on a receiving and detection unit with dichroitic mirrors, absorption filters and photoelectric detectors. These detectors convert the optical signals into electric signals, which are conducted to the evaluating electronic device.

13 Claims, 6 Drawing Sheets

PHOTOELECTRIC SCANNER

BACKGROUND OF THE INVENTION

The invention concerns a photoelectric scanner for use in the automatic analysis of color compositions in particular of copy masters. A scanner of this type is known for example from DE-OS-24 59 546. In the scanner described therein the scanning light coming from a light source is guided by reflection from the mirror surface of a motor-driven mirror wheel transversely to the longitudinal direction of a film to be scanned (copy master).

Another scanner is known from U.S. Pat. No. 3,677,641. In the case of the scanner described therein the copy master in the form of a film is exposed to the light of a source of light. The scanning light passes through the film and a rotating drum, in the center of which a mirror is located and having orifices in its outer wall. By the position of the mirror and the rotation of the drum orifices the detectors receiving the scanning light passing through the drum, are queried.

A further scanner is known from DE-OS-24 45 831. In the scanner described therein, the scanning light coming from a source of light impacts the copy master, for example, in the form of a film. Beyond this film a slit diaphragm is provided, which comprises a narrow slot transverse to the longitudinal direction of the film. This slit diaphragm is followed by a rotating slotted disk, the slots of which are essentially radial. If a slot on the rotating disk coincides with the slot of the slit diaphragm, a section of the scanning light is passed through and is detected by a photocell.

Scanners of this type are used for example in high capacity printers. In the case of another known scanner used in such applications a light source projects a beam of light onto a circular disk, which rotates at a short distance parallel to the copy master and contains orifices to define a point to be scanned on the copy master. The light coming from the copy master is received by a detection unit.

The trend in the scanning of copy masters tends toward higher and higher resolutions. This increasingly requires smaller and more numerous scanning points per copy master, which in turn and in different ways requires greater capacities of the detectors and of the evaluating electronics. On the one hand, the scanning time per point must be short as possible, as the number of points in the case of higher resolutions is higher, and on the other, the minimally detectable light intensity must be lower, since with identical light intensities in the scanning point but with smaller dimensions of said point, the quantity of the light impacting the detector will be correspondingly smaller. All of the aforementioned scanners have the disadvantage that the diminishing of the dimensions of the scanning point is always followed by a loss of light power. This renders the detection of the scanning light considerably more difficult.

SUMMARY OF THE INVENTION

In view of these and other limitations, it is the object of the invention to increase the light intensity in a point of reduced dimensions, in order to obtain a higher radiation point, thereby simplifying detection.

This object is attained according to the invention by utilizing a motor driven diaphragm having at least one light collecting optic for guiding the scanning light line by line over the master. By increasing the intensity by focusing in the scanning point, the intensity of the light may be maintained fully on the detector or even increased, in spite of the smaller scanning point, whereby the detection of light coming from the smaller scanning points is considerably simplified and higher resolutions obtained.

BRIEF DESCRIPTION OF THE DRAWINGS

Other objects and advantages of the present invention will become more apparent from the following detailed description of preferred embodiments as described with reference to the drawings in which.

DETAILED DESCRIPTION OF THE PREFERRED EMBODIMENTS

Figure 1:
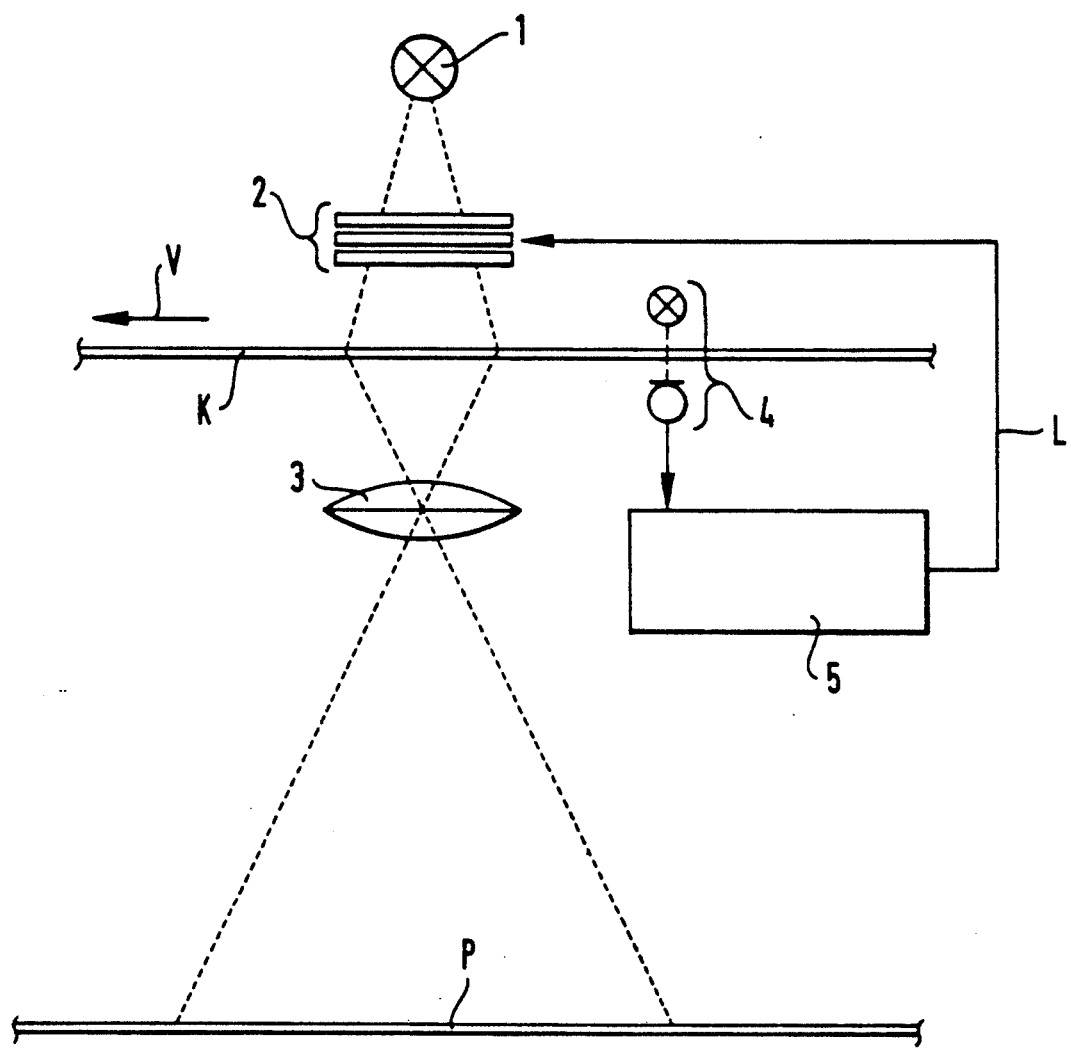
FIG. 1 shows in a schematic view a copying apparatus according to the state of the art.

The copying apparatus shown in FIG. 1 comprises a copying light source 1, a set of servo-controlled color shutters 2, imaging optics 3, a photoelectric scanning apparatus 4 symbolically indicated by a measuring light source and an exposure control device 5. The copy master in the form of a photographic film K exposed to light coming from the copy light source 1 is reproduced by means of the optics 3 on a light sensitive copy material P. The quantities of copying light for the individual partial exposures are determined by the exposure control 5 on the basis of a previous photoelectric measuring and measure analysis of the areas of the copy master, and controlled by the color shutters 2. (Hereinbelow, symbol K is used both for copy masters in general and for films in particular).

In the known high capacity printers the photoelectric measuring of the copy master is carried out by the measuring of numerous small partial areas, for example with a resolution of 100 scanning areas (points) per master. In each of these areas, the three color extract values are determined for the colors red, blue and green by suitable measuring filters; they correspond approximately to the sensitivities of the copy material. These 3 times approximately 100 color extract values (usually in the form of color density values) are then evaluated by different criteria to determine the quantities of copying light.

Figure 2:
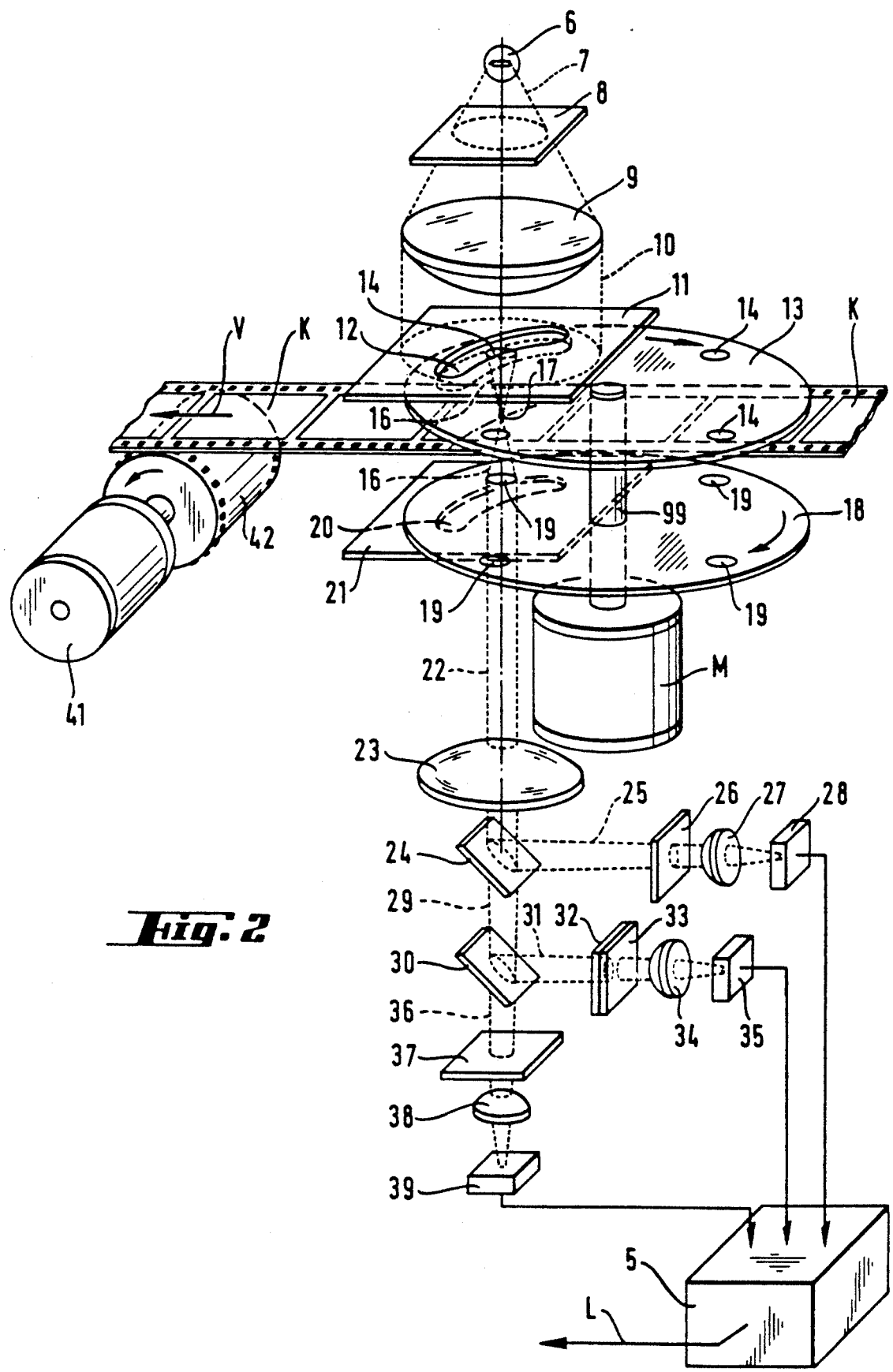
FIG. 2 shows in a perspective schematic view a first embodiment of a scanning apparatus according to the present invention.
Figure 3:
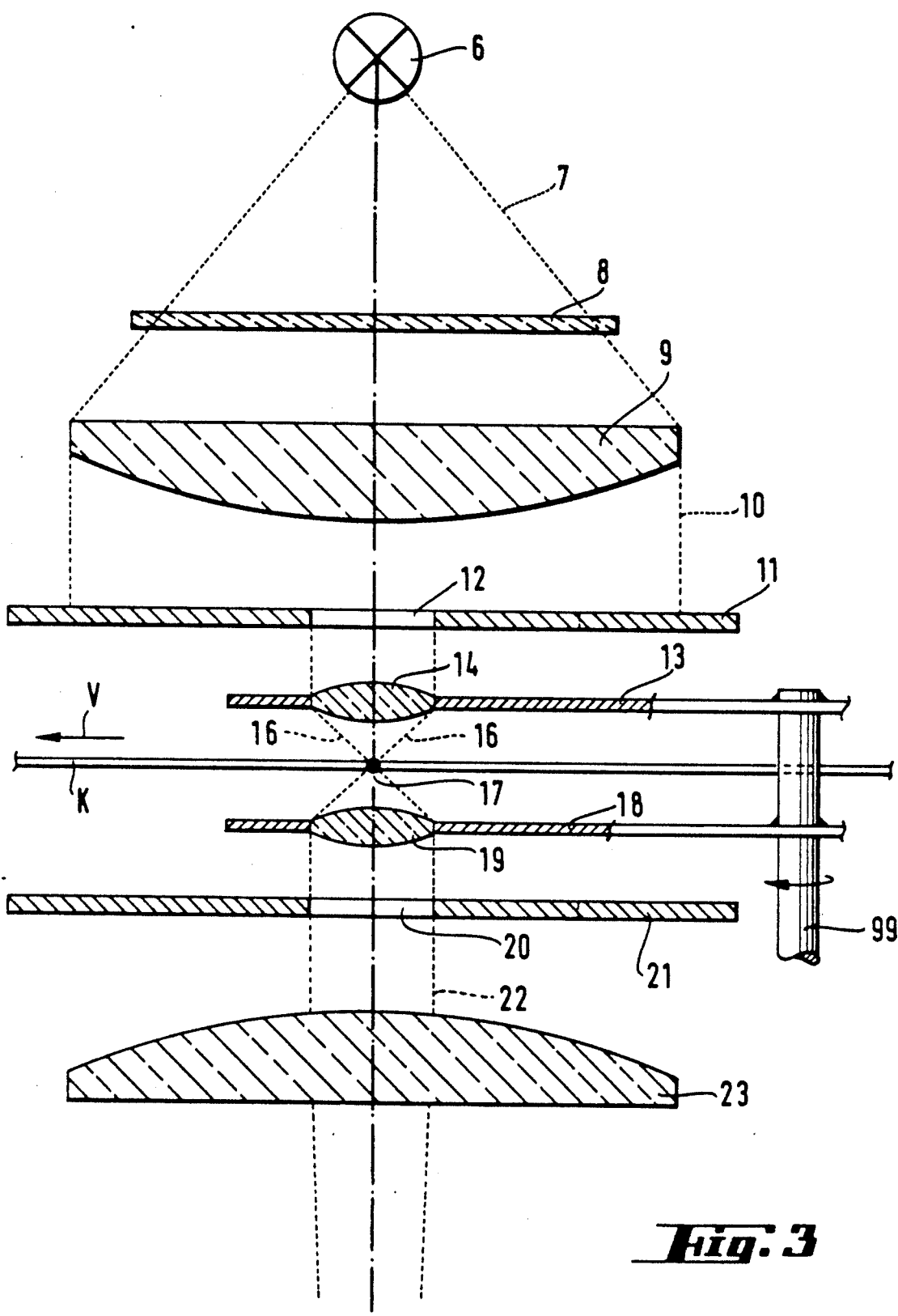
FIG. 3 shows a detail of FIG. 2 in an axial section.

FIGS. 2 and 3 show an exemplary embodiment of the scanning apparatus of the present invention, whereby the color extract values for the determination of the copy light quantities are obtained. A source of measuring light 6 emits a divergent bundle of light rays 7, which travels through a heat protection filter 8, and falls on a convex condenser lens 9. In this manner, a cylindrical beam bundle 10 is produced which impacts a stationary upper diaphragm 11, which has approximately in its center a curved slot 12. A circular disk 13 is located under the diaphragm 11, having orifices along its circumference in which lenses 14 are mounted. Under this disk 13 the copy master in the form of a photographic film K is located. The film K is passed over a transport roller 42, which, driven by a motor 41, conveys the film K in the direction of advance $V_1$. A second circular disk 18 having orifices with lenses 19 is located below and in a plane parallel to the plane of the film K. The disk 18 is the same distance from the plane of the film K as is the disk 13. The two disks 13 and 18 are mounted on a common shaft 99 driven by a motor M, with the orifices and lenses 14 and 19 being aligned with each other. Under the disk 18 a second stationary diaphragm 21 having a curved slot 20 is located equidistant to the plane of the film K with the upper diaphragm 11. Below the curved slots 12 and 20 in the beam path, another condenser lens 23 is located.

The beam bundle 10 coming from the condenser lens 9 is blocked by the upper diaphragm 11, with part of it passing through the curved slot 12, which is located in the approximate center of the diaphragm 11. The lenses 14 mounted in the orifices of the disk 13 rotating under the diaphragm 11 describe a circular path, which in the area of the diaphragm 11 passes exactly under the slot 12. The width of the slot 12 is approximately equal to the diameter of the lenses. The length of the slot 12 is approximately the same as the width of the copy master K. The light incident on the slot 12 is released onto the copy master through the lens 14 as the lens 14 appears in the rotation of the disk 13 under the slot 12. The light incident on the lens 14 is focused into a point 17 located in the plane of the copy master or the film K and which is the instantaneous measuring point 17. This measuring point travels across the width of the master K as the rotation of the disk 13 carries the lens 14 along the curve of the slot 12, as will be discussed further below.

The light rays travelling through the master K (the bundle of rays is indicated by the boundary rays 16 with a dash-and-dot line) are again made parallel by the lenses 19 mounted in the orifices of the disk 18, which rotates synchronously with the disk 13, as the focus of the lenses 19 coincides with the corresponding lens 14, i.e. the point of measurement. This parallel beam 22 passes through the slot 20 of the lower diaphragm 21, which in a manner corresponding to the slot 12 of the upper diaphragm 11 is located exactly under the path of the lenses 19, and is focused by the condenser lens 23 onto a receiving and detecting unit.

The size of the lenses in relation to the disk, together with the dimensions of the slot of each of the diaphragms are shown generally larger, for reasons of representation and in view of their importance.

The receiving unit comprises three essentially similar receiving and detecting layouts, one each for the frequency band of the blue, red and green light, each of them containing an absorption filter 26, 32 and 37, respectively, a detector lens 27, 34 and 38, respectively, and a detector 28, 35 and 39, respectively. For the frequency band of the red light a heat protection filter 33 is provided additionally; it follows the absorption filter 32 directly. To separate the individual frequency bands, the receiving and detection unit contains two interference mirrors 24 and 30, located at an approximate angle of 45° relative to the axis of the beam 22 coming from the copy master and the beam 29 passed by the first mirror 24.

The beam 22 coming from the copy master impacts the first interference mirror 24. The mirror coarsely filters from the spectrum the frequency band of the blue light, by reflecting the blue light and allowing the other spectral components 29 to pass. The coarsely filtered blue light 25 impacts an absorption filter 26, which filters a finer band from the coarsely filtered band, the finer band then being focused on the detector 28 by means of a detector lens 27. The beam 29 passed by the mirror 24 with the frequency band of the blue light subtracted, impacts a second interference mirror 30, which coarsely filters the frequency band of the red light 31 from the remaining spectrum by the same principle as the mirror 24. This red light, filtered out by reflection, impacts a second absorption filter 32, which filters a finer band from the coarsely filtered band, which, after passing through a heat protection filter 33, is imaged by detector lens 34 on the corresponding detector 35. The beam 36 passed by the mirror 30, diminished by the frequency bands of the blue and red light, impacts a third absorption filter 37, which filters from the remaining spectrum the frequency band of the green light and reproduces it by means of detector lens 38 on the corresponding detector 39. The signals supplied by the detectors 28, 35 and 39 of the receiving unit are passed to an electronic device 5, which evaluates them.

A condition of the operation of the scanner described is that the lenses 14 and 19, located in the orifices of the two disks 13 and 18, are always aligned. For this reason, the disks 13 and 18 must rotate in absolute synchronization. This synchronous motion is achieved, for example, by rigidly connecting the disks 13 and 18 to the shaft 99. The shaft 99 is located laterally offset adjacent to the copy master K, in order to keep the transport path free for the film K in the direction of advance.

Figure 4:
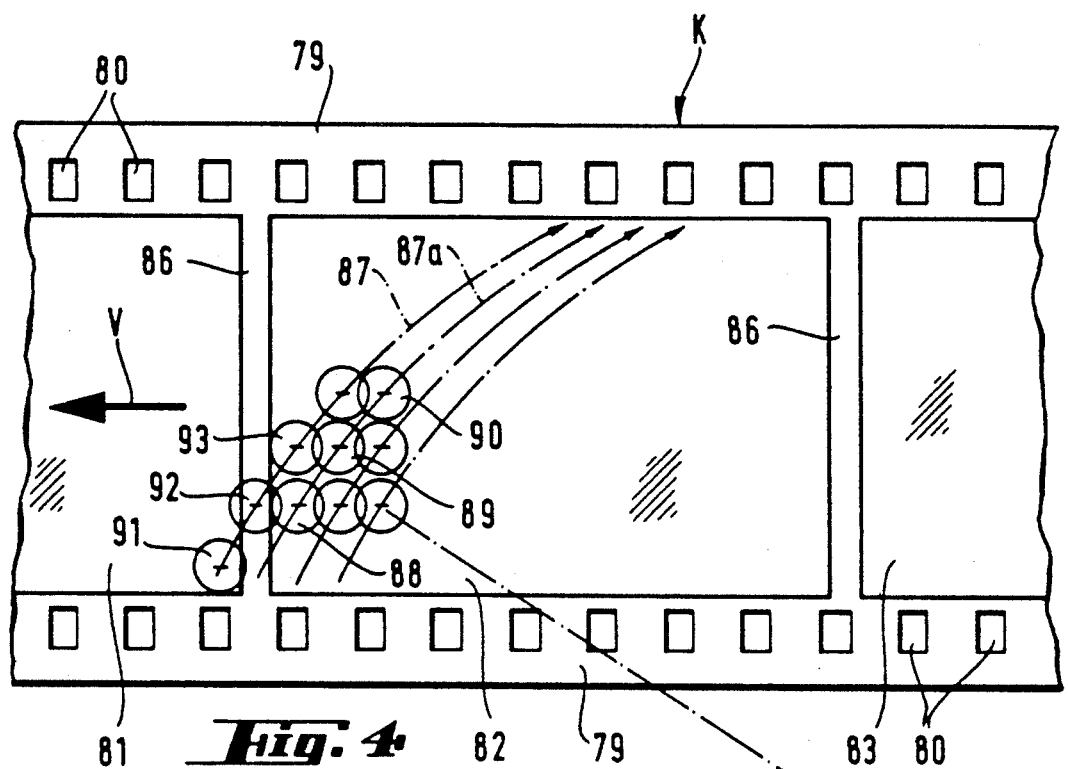
FIG. 4 shows in a top elevation a master scanned by the scanning device of FIG. 2.

The scanning of the film K with the scanner of FIG. 2 with a laterally offset shaft 99, yields a scanning diagram such as that shown in FIG. 4, which is a top elevation of a piece of a commercially developed negative strip of film having side perforations 80 and image fields 81, 82, 83 separated by webs 86. In FIG. 4, the shaft 99 extending laterally to the film, is also indicated. The shaft 99 is positioned adjacent to the film so that the lenses 14 and 19 move along arc shaped scanning lines 87, 87a, etc. at an approximate angle of 45° over the film. The distance between two scanning lines is given by the advance velocity of the film strip, which is moving continuously. Resolution into individual measuring points 88, 89, 90, etc. along the scanning lines takes place by sampling in the electronic device 5. By suitable sorting of the measuring points a nearly square measuring grid may be obtained.

As along scanning line 87, measuring points 91, 92, 93, etc. corresponding to two different image fields, for example 81, 82 or a web 86, may be obtained, resulting in points belonging to at least three adjacent image fields 81, 82, 83 being stored. This situation always occurs at the beginning and end of each image field. Since in the detection of the measuring points by the electronic device 5 no correlation of these measuring points with image fields takes place, the measuring points of at least three adjacent image fields must always be stored.

Following the detection of the measuring points, the points are initially correlated with the individual image fields in the electronic device 5 by a computer program, then sorted within the individual image fields and subsequently each field is evaluated by different criteria. The control signals formed in this manner are transferred image by image over a line L to the color shutters 2 (FIG. 1) to control the quantities of copying light.

Figure 5:
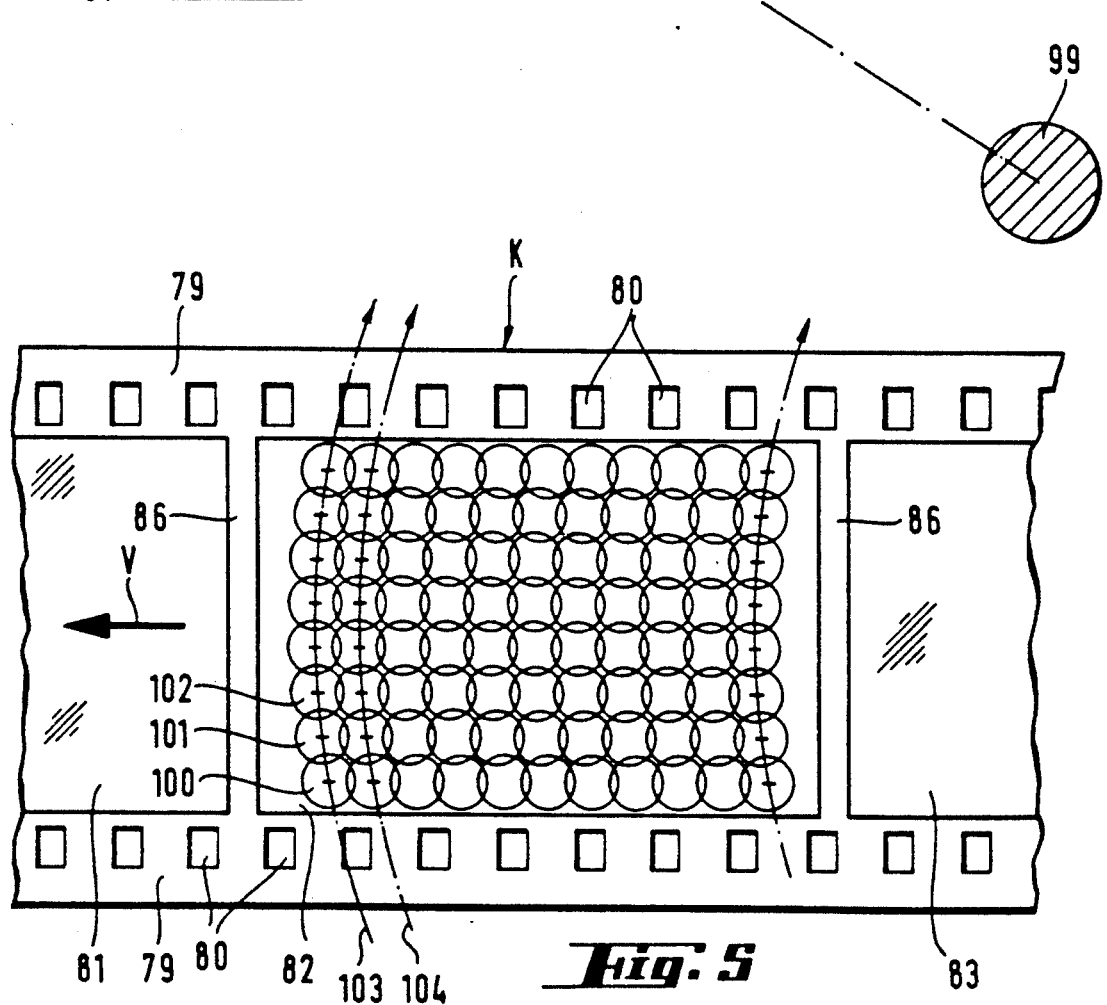
FIG. 5 shows in a top view a master scanned by a modified embodiment (not shown) of the scanning device of FIG. 2.

FIG. 5 shows a scanning diagram obtained if the axis of rotation of the two disks 13 and 18 passes through the center line of the film K. In this case, because the shaft cannot pass through the film K, the disks 13 and 18 must be synchronized electronically or mechanically, for example by means of an angular gear. In this scanning diagram the measuring points 100, 101, 102, etc. perpendicularly intersect the center line of the film. In this case a nearly square grid is obtained directly (without electronic conversion).

The alternative embodiments shown in FIGS. 6 and 7 again contain a source of measuring light 60, followed by a heat protection filter 61 and a condenser lens 62 to produce a parallel beam 63. The beam is incident on a stationary upper slit diaphragm 65 having a slot 66, under which a cylindrical lens 67 is located, the width of which approximately corresponds to the width of the slot 66 and its length approximately to the length of the slot 66 and thus approximately to the width of the film K and the image fields, respectively. Under this cylindrical lens 67, a motor driven disk 72 is rotating at a slight distance above the plane of the copy master (film K) and parallel to it, said disk 72 containing four orifices 78, as seen in FIG. 7, which extend helically from the edge of the disk toward its center. Under the copy master (film K) a second cylindrical lens 73 is located, the focal line of which coincides with the focal line 77 of the upper cylindrical lens 67 in the plane of the copy master K. This cylindrical lens 73 is followed by another stationary slit diaphragm 74, the slot width of which approximately corresponds to the width of the cylindrical lens 73 and its slot length approximately to the length of the cylindrical lens 73 and thus approximately to the width of the copy master K. The slit diaphragm 74 is followed by another condenser lens 76.

The rays of the divergent beam coming from the source of measuring light 60 are made parallel by the condenser lens 62 after passing through the heat protection filter 61. This parallelized beam 63 impacts the upper diaphragm 65 and is able to penetrate it only through the slot 66, which in contrast to the example of FIG. 2 is not curved. The part of the beam passing through the slot 66 is focused by the cylindrical lens 67 along the focal line 77 and in the plane of the copy master K, in the direction of a line to be scanned. Only in the intersection of the helical orifice 78 of the disk 72 with the beam path of the cylindrical lens 67 does the light arrive on the copy master K at the instantaneous measuring point 57. The helical slot of the disk 72 is curved in a manner such that the scanning light point 57 moves at a constant velocity along a line over the copy master K. The result is a scanning pattern on the master K, as shown in FIG. 8 and described hereinbelow.

The beam (its boundary rays 68–71 are indicated by dash-and-dot lines) coming from the measuring point 57, is again made parallel by the second cylindrical lens 73, the focal line of which coincides with the focal line 77 of the upper cylindrical lens 67. It impacts a receiving and detection unit after passing through another straight slit diaphragm 74, the slot width whereof is approximately equal to the width of the cylindrical lens 73 and its length approximately equal to the length of the cylindrical lens 73 and thus to the width of the copy master K, and through a condenser lens 76. This may have for example the configuration described above in relation to FIG. 2. In a further embodiment, the cylindrical lenses 67 and 73 may also be mounted directly in the slots 66 and 75, as shown by broken lines 58 and 59 in FIG. 4.

Figure 6:
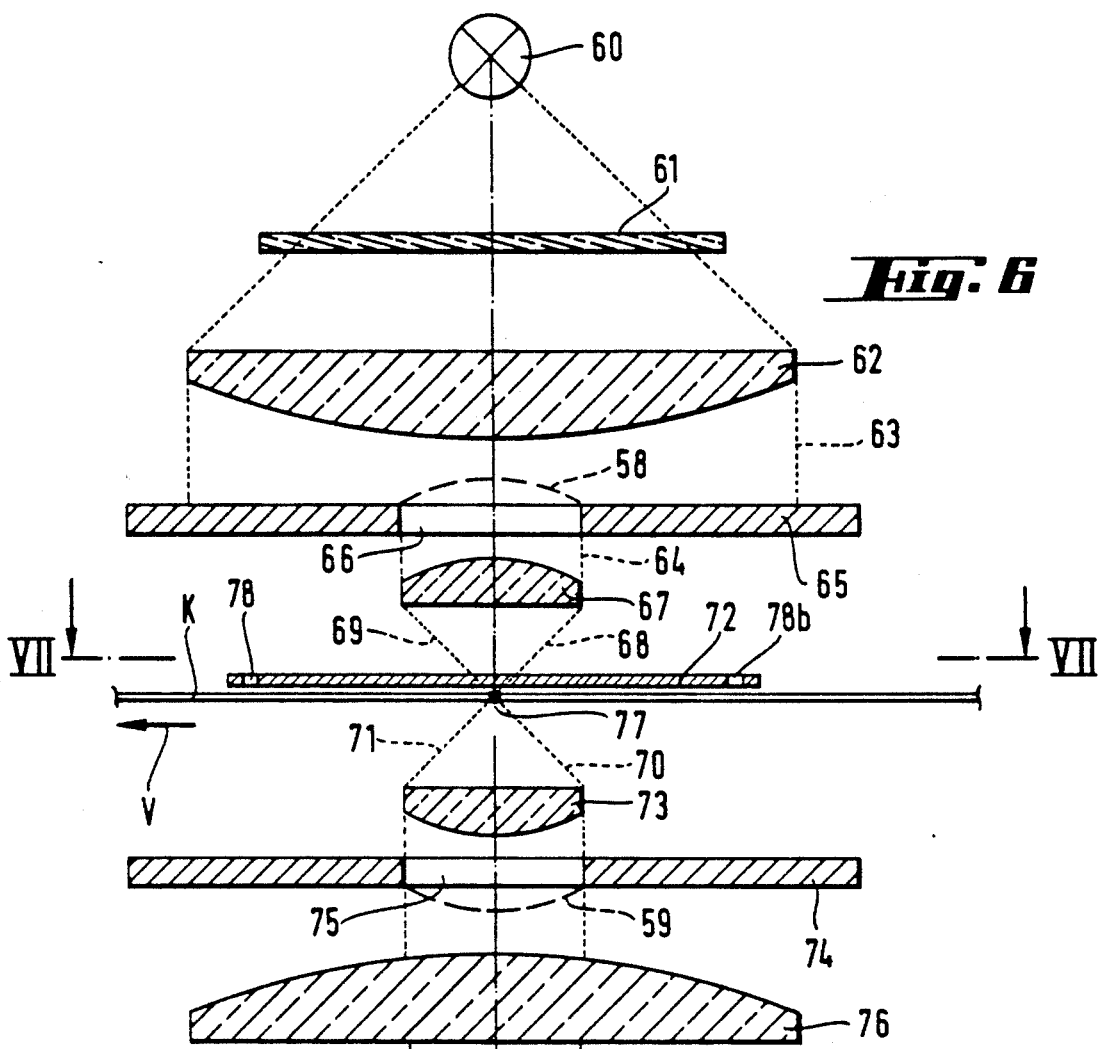
FIG. 6 shows a second exemplary embodiment of the detail shown in FIG. 3, again in an axial section.
Figure 7:
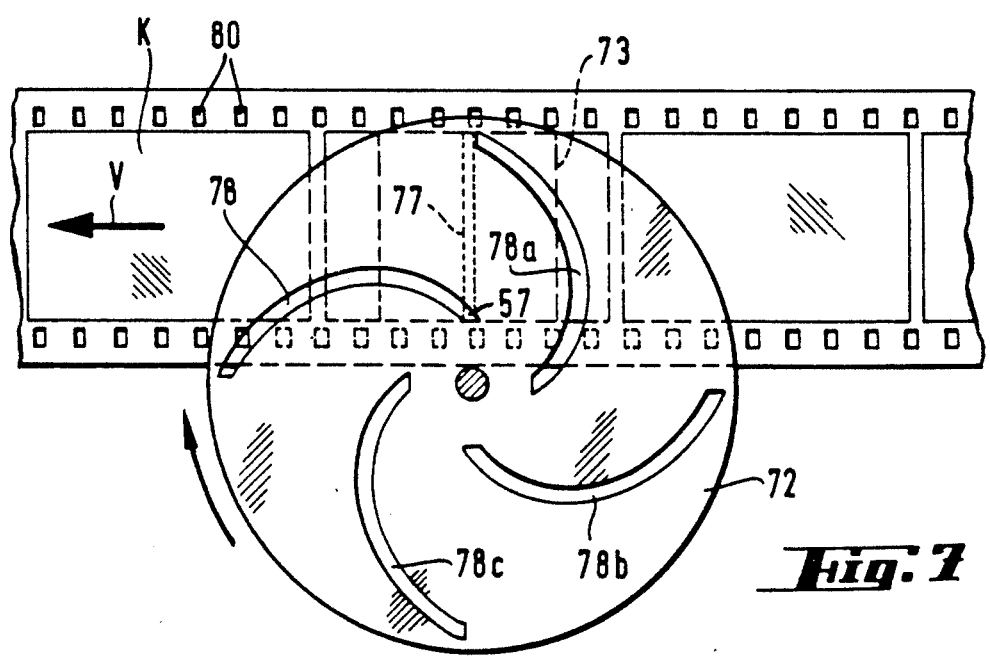
FIG. 7 shows a top elevation in the direction of the arrows VII—VII in FIG. 6.
Figure 8:
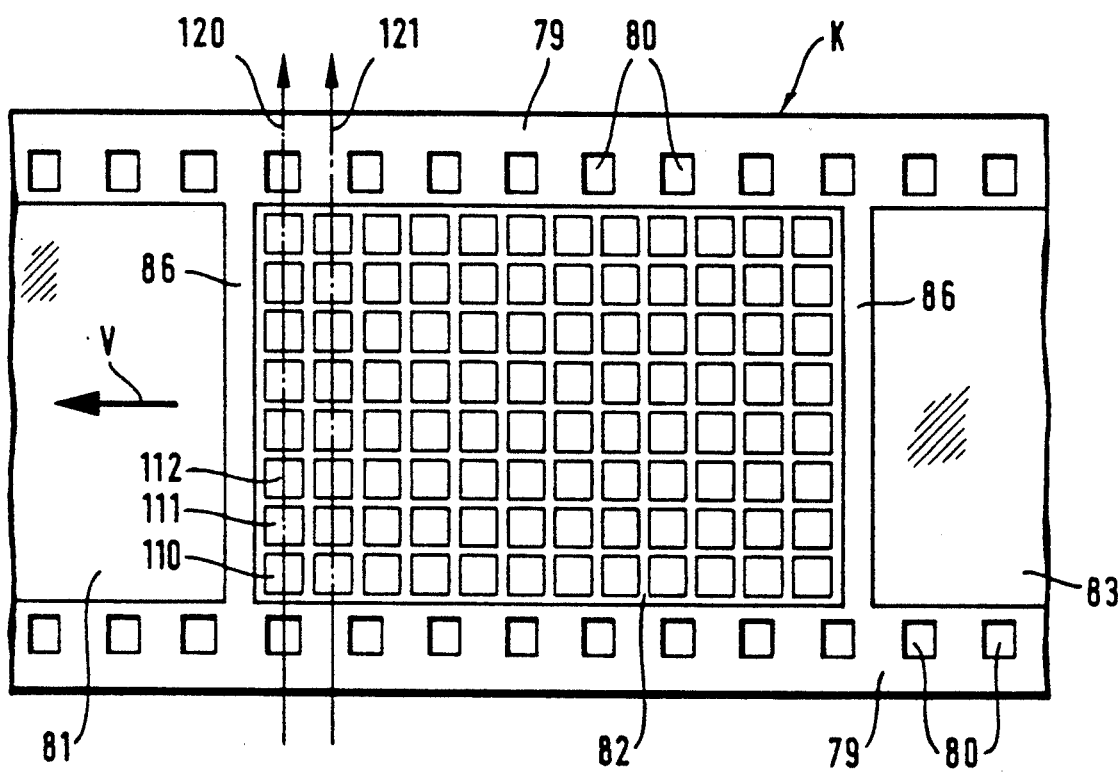
FIG. 8 shows in a top elevation a master scanned by a scanning device according to FIG. 6.

FIG. 8 shows the scanning diagram obtained in the scanning of a master K with the scanning apparatus according to FIGS. 6 and 7. In the course of the scanning of the master a measuring point is always created on the film strip at the intersection of the helical orifice 78 of the disk 72 with the beam path 68 and 69 of the light coming from the cylindrical lens 67. The resolution into discrete measuring points 110, 111, 112, etc. is carried out by electronic sampling. The measuring point moves along nearly straight lines 120,121, etc., approximately perpendicularly to the direction of advance V of the film strip. The deviation from the "optimal geometry" is created by the continuous transport of the master in the direction of advance V. However, this deviation is slight, as the velocity of the scanning of a line is very high relative to the transport velocity of the film strip. The velocity of the scanning of a line requires a high rpm of the disk 72. This high rpm is reduced by providing altogether four helical orifices 78,78a, 78b, 78c located on each of the 90° segments of the disk, as shown in FIG. 7. The number of helical orifices corresponds to the multiplication of the scanning frequency relative to a disk with only one helical orifice. The form of the helical orifice 78, 78a, etc. affects the dimensions of the measuring point. If the orifice 78, 78a, etc. intersects the beam path 68 and 69 of the light coming from the cylindrical lens 67 as perpendicularly as possible, nearly square measuring prints are obtained, the dimensions of which are smaller than if the beam path would be intersected obliquely. The scanning diagram created in this manner is indicated by the squares 110, 111, 112.

As mentioned above, the scanners described, which have the advantage of high resolution combined with safe detection, are especially suitable for use in copying machines. However, they are obviously also suitable for other applications, in which the master is not a photographic negative or positive film strip.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. Photoelectric scanner for scanning a copy master, in which at least one moving diaphragm device guides the scanning light line by line over the master, said diaphragm device being equipped with at least one light collecting optic, the focus of which is located near or in a plane of the master.

2. Scanner according to claim 1, wherein the diaphragm device has at least one diaphragm orifice moving over said copy master and the light collecting optics are disposed directly in said diaphragm orifices.

3. Scanner according to claim 2, wherein under the plane of the copy master at least one additional light collecting optical device is located, said devices being aligned with the optical devices located in the diaphragm orifices, and having a focus approximately coinciding with that of the light collecting optical devices located in the diaphragm orifices and wherein said additional optical devices move synchronously with and parallel to the light collecting optics of the diaphragm orifices.

4. Scanner according to claim 3, wherein said synchronous motion is achieved by mechanically coupling said light collecting optics of said diaphragm orifices with said additional light collecting optical devices.

5. Scanner according to claim 3, wherein the light collecting optical devices located in the diaphragm orifices are disposed on or near a periphery of a first circular disk rotating around its center above the plane of the master, and the additional light collecting optical devices are disposed on or near the periphery of a second circular disk rotating around its center synchronously with said first circular disk under the plane of the master, both circular disks rotating parallel to the plane of the master.

6. Scanner according to claim 2, wherein each of said light collecting optics is cylindrical and extends stationarily in the direction of the scanning lines over the plane of said copy master and the moving part of the diaphragm device consists of at least one slit diaphragm located between said cylindrical light collecting optic and said copy master, said slit diaphragm moving near the master periodically in the beam path of the cylindrical light collecting optic and producing by crossing said path a scanning light point running in the direction of the scanning line.

7. Scanner according to claim 6, wherein the moving part of the diaphragm device is formed by a disk rotating around its center and having thereon an essentially radial slot.

8. Scanner according to claim 7, wherein the axis of rotation of the rotating disk extends through the center line of the master perpendicular to the direction of the scanning lines.

9. Scanner according to claim 7, wherein each slot of the rotating disk extends helically from approximately the center of the disk to its edge, and the curvature of each slot is such that the velocity of the intersection of the helical slot with the beam path of the cylindrical light collecting optic is nearly constant, so that the point of light released by the slot is moving in the plane of the copy master at a nearly constant velocity.

10. Scanner according to claim 6, wherein under the master a second cylindrical light collecting optical device is located, said device extending stationarily in the direction of the scanning lines and having its focal line approximately coinciding with the focal line of the cylindrical light collecting optic located above the master.

11. Scanner according to claim 10, wherein said stationary slit diaphragms having slots are located both above the upper cylindrical collecting optic and under the lower cylindrical collecting optic, wherein the dimensions of the slot correspond approximately to the dimensions of the cylindrical collecting optic, and wherein the cylindrical collecting optic is located directly in the diaphragm slot.

12. Apparatus for the copying of photographic copy masters, comprising:
a source of copying light;
a set of servo-controlled color shutters;
an imaging optical device;
an electronic exposure control; and,
a photoelectric scanning device wherein said imaging optical device reproduces a master exposed to the light coming from the source of copying light on a photosensitive copying material via the color shutters, quantities of copying light for the individual partial exposures being controlled by the exposure control according to signals supplied by sensors of the photoelectric scanning device, said photoelectric scanning device further including at least one moving diaphragm device for guiding a scanning light line by line over the master, said diaphragm device being equipped with at least one light collecting optic, the focus of which is located near or in a plane of the master.

13. A photoelectric scanner for scanning a copy master, comprising:
means for transporting said copy master;
means for providing a cylindrical beam of light, the rays of which are parallel and directed so as to pass through said copy master in a direction perpendicular to the plane of said copy master;
first means for blocking out all but a curved portion of said cylindrical light beam, disposed between said light providing means and said copy master;
first rotating means disposed between said first means for blocking light and said copy master, and having a plurality of light collecting optics disposed thereon, said light collecting optics focused in the plane of said copy master, said first rotating means rotating in a manner such that each of said light collecting optics alternately passes under and along said curved portion of said first means for blocking light so as to focus said light in a point which moves across said copy master as the rotating means rotates;
second rotating means disposed on the opposite side of said copy master from said first rotating means and having a plurality of light collecting optics disposed thereon, said light collecting optics having a focus coincident with the focus of said light collecting optics of said first rotating means, said second rotating means rotating synchronously with the rotation of said first rotating means such that said light collecting optics of said second rotating means are aligned with said light collecting optics of said first rotating means so as to collect the light travelling through said first light collecting optics and said copy master, said light being focused by said light collecting optics of said second rotating means into a cylindrical beam;
second means for blocking out all but a curved portion of said cylindrical light beam, disposed in a manner such that the rotation of said second rotating means causes each of said light collecting optics disposed thereon to alternately pass above and along said curved portions;
means for measuring each of the red, blue and green components of said light beam after said light beam has passed through said second means for blocking light;
means responsive to the values obtained by said measuring means, for evaluating the color pattern of said copy master.

* * * * *